United States Patent
Li et al.

(10) Patent No.: US 10,764,928 B2
(45) Date of Patent: Sep. 1, 2020

(54) COMMON RANDOM ACCESS CHANNEL RESOURCE BASED COORDINATED RANDOM ACCESS

(71) Applicant: Nokia Technologies Oy, Espoo (FI)

(72) Inventors: Zexian Li, Espoo (FI); Juho Pirskanen, Kangasala (FI); Martti Moisio, Klaukkala (FI); Mikko Uusitalo, Helsinki (FI); Juha S. Korhonen, Espoo (FI)

(73) Assignee: Nokia Technolgies Oy, Espoo (FI)

( * ) Notice: Subject to any disclaimer, the term of this patent is extended or adjusted under 35 U.S.C. 154(b) by 0 days.

(21) Appl. No.: 15/566,757

(22) PCT Filed: Apr. 24, 2015

(86) PCT No.: PCT/US2015/027604
§ 371 (c)(1),
(2) Date: Oct. 16, 2017

(87) PCT Pub. No.: WO2016/171731
PCT Pub. Date: Oct. 27, 2016

(65) Prior Publication Data
US 2018/0098356 A1    Apr. 5, 2018

(51) Int. Cl.
*H04W 74/08*    (2009.01)
*H04W 72/12*    (2009.01)
*H04W 88/02*    (2009.01)

(52) U.S. Cl.
CPC ... *H04W 74/0833* (2013.01); *H04W 72/1278* (2013.01); *H04W 88/02* (2013.01)

(58) Field of Classification Search
CPC ......... H04W 74/0833; H04W 72/1278; H04W 88/02

(Continued)

(56) References Cited

U.S. PATENT DOCUMENTS 10,159,091 B2 *  12/2018  Wang .................. H04W 74/006
2009/0316630 A1 *  12/2009  Yamada ............ H04W 56/0005
370/328

(Continued)

FOREIGN PATENT DOCUMENTS

EP       2077692 A2    7/2009
EP      2 555 568 A2    2/2013

(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304, V12.3.0, Dec. 2014, pp. 1-37.

(Continued)

*Primary Examiner* — Christopher R Crompton
(74) *Attorney, Agent, or Firm* — Harrington & Smith

(57) ABSTRACT

Various communication systems may benefit from reliable random access. For example, fifth generation (5G) wireless communication systems may benefit from a coordinated reliable random access technique based on common random access channel resources for a quality of service aware multi-connectivity link. A method can include preparing a random access message at a user equipment. The method can also include transmitting the random access message from the user equipment on a shared resource. The shared resource can include a resource, such as a random access channel, known by a plurality of access nodes or shared by a plurality of access nodes.

20 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2010/0113051 A1 | 5/2010 | Du et al. | |
| 2012/0275390 A1* | 11/2012 | Korhonen | H04W 74/006 |
| | | | 370/329 |
| 2013/0238882 A1* | 9/2013 | Suzuki | G06F 11/1407 |
| | | | 712/228 |
| 2014/0098763 A1 | 4/2014 | Hakola et al. | |
| 2014/0369322 A1* | 12/2014 | Fwu | H04L 5/0037 |
| | | | 370/336 |
| 2014/0376486 A1 | 12/2014 | Lee et al. | |
| 2015/0296542 A1* | 10/2015 | Heo | H04W 74/0833 |
| | | | 370/329 |
| 2016/0309520 A1* | 10/2016 | Murakami | H04W 74/0841 |
| 2017/0013647 A1* | 1/2017 | Uchino | H04W 74/08 |
| 2017/0325057 A1* | 11/2017 | Zhang | H04W 4/02 |

FOREIGN PATENT DOCUMENTS

| | | |
|---|---|---|
| JP | H11261470 A | 9/1999 |
| JP | 2013528968 A | 7/2013 |
| WO | 2013/140437 A1 | 9/2013 |
| WO | 2015/020576 A1 | 2/2015 |

OTHER PUBLICATIONS

International Search Report and Written Opinion received for corresponding Patent Cooperation Treaty Application No. PCT/US2015/027604, dated Jan. 4, 2016, 12 pages.
Office action received for corresponding Japanese Patent Application No. 2017-555402, dated Oct. 15, 2018, 4 pages of office action and 4 pages of translation available.

* cited by examiner

COMMON RANDOM ACCESS CHANNEL RESOURCE BASED COORDINATED RANDOM ACCESS

RELATED APPLICATION

This application was originally filed as PCT Application No. PCT/US2015/027604 filed on Apr. 24, 2015.

BACKGROUND

Field

Various communication systems may benefit from reliable communication including random access. For example, fifth generation (5G) wireless communication systems may benefit from a coordinated reliable random access technique based on common random access channel resources for a quality of service aware multi-connectivity link.

Description of the Related Art

The next generation of mobile communication systems, 5G, may benefit from satisfying new and yet not supported requirements in current fourth generation (4G) systems in terms of reliability. For example, 5G may need to support emerging applications, such as road safety, industrial automation, e-health services, and so on.

For example, some road safety applications may require that the information packets are successfully delivered within a certain deadline and with very high successful probability. The failure to comply with these requirements could have serious implications for the well-being of the users relying on the road safety service. Another example is industry automation, where reliability may be the most important criteria for system design.

There are various techniques that can be utilized to increase communication reliability. Multi-connectivity, including for example multi-site, multi-layer, may be used to increase the reliability. Dual-connectivity is one form of multi-connectivity. 3GPP Release 12 (REL-12) long term evolution (LTE) dual-connectivity, which splits control-plane and user-plane, is not focused on reliability, but more on capacity improvement.

Considering the future 5G system, it is predicted that heterogeneous network (HetNet) deployment will become more popular. These deployments may be heterogeneous networks which may be heterogeneous not only according to size, but also with different frequencies e.g. cmW, mmW, below 6 GHz. In future deployment there may be heavily overlapped coverage area from different network nodes.

When one device would like to get access to network, it may need to know how to select the right cell(s) which can be connected to provide the desired performance, such as a particular minimum reliability level. According to today's implementation, for example, in LTE, the user equipment (UE) can measure cells and can consider a cell suitable if the cell downlink reception power meets threshold. Among different cells that are considered suitable, the UE selects the cell that has highest absolute priority.

In universal terrestrial radio access network (UTRAN), UE performs cell ranking where cells are compared with or without cell specific offsets. In the LTE solution, the UE in general connects to the cell with strongest received signal on highest priority level that has any suitable cell. However, this is not always the most optimal way. For example, in dense urban area it may be desired that UEs will connect to higher frequencies providing higher capacity by smaller cells. Thus, when UE is moving, for example in a car, it may be beneficial to camp on lower frequency that provide larger cells and coverage.

Considering the future stricter requirements on reliability, it may be that a single cell would not provide the required high reliability especially for UEs in cell border area or UEs moving between cells. Different coordinated multipoint (CoMP) schemes may support having connections to multiple eNB simultaneously but those can be applied only when a connection is already established and thus such an approach is not applicable when a connection is established.

Current cell selection/re-selection is based on various criteria. For example in LTE the cell selection criterion is known as the S-criterion and is fulfilled when the cell selection receive level value satisfies Srxlev>0 dB, where Srxlev is the cell selection Rx level value in dB, as explained in 3GPP technical specification (TS) 36.304, which is hereby incorporated herein by reference in its entirety.

Additionally, CoMP transmission can be used to improve cell edge performance and improve reliability. However existing CoMP schemes can be only used when a connection is established and the network configures such a transmission scheme. A similar situation is also valid in UTRAN soft/softer handover (HO), which can only be utilized after connection setup.

Finally, another RACH approach is to deploy multiple eNB receivers or cells that utilize same RACH resources and perform soft or macro combining of the received RACH messages. In such schemes, either RACH resources need to be increased corresponding to the number of eNBs sharing the same resource, or an increased collision probability has to be accepted. The increased collision probability is due to the fact that a combining unit cannot know whether the signal received in one RACH resource comes from one UE or from multiple UEs.

SUMMARY

According to certain embodiments, a method can include preparing a random access message at a user equipment. The method can also include transmitting the random access message from the user equipment on a shared resource. The shared resource can include a random access channel shared by a plurality of access nodes.

In certain embodiments, a method can include receiving an indication that a user equipment has sent a random access message on a shared resource. The shared resource can include a random access channel shared by a plurality of access nodes. The method can also include performing local coordination of at least two of the plurality of access nodes with respect to the random access message.

A method, according to certain embodiments, can include receiving a random access message from a user equipment on a shared resource. The shared resource can include a random access channel shared by a plurality of access nodes. The method can also include determining whether to provide a locally coordinated response to the random access message. The method can further include providing a response to the random access message based on the determination.

An apparatus, in certain embodiments, can include at least one processor and at least one memory including computer program code. The at least one memory and the computer program code can be configured to, with the at least one processor, cause the apparatus at least to prepare a random access message at a user equipment. The at least one memory and the computer program code can also be configured to, with the at least one processor, cause the apparatus at least to transmit the random access message from the user equipment on a shared resource. The shared resource can include a random access channel shared by a plurality of access nodes.

According to certain embodiments, an apparatus can include at least one processor and at least one memory including computer program code. The at least one memory and the computer program code can be configured to, with the at least one processor, cause the apparatus at least to receive an indication that a user equipment has sent a random access message on a shared resource. The shared resource can include a random access channel shared by a plurality of access nodes. The at least one memory and the computer program code can also be configured to, with the at least one processor, cause the apparatus at least to perform local coordination of at least two of the plurality of access nodes with respect to the random access message.

In certain embodiments, an apparatus can include at least one processor and at least one memory including computer program code. The at least one memory and the computer program code can be configured to, with the at least one processor, cause the apparatus at least to receive a random access message from a user equipment on a shared resource. The shared resource can include a random access channel shared by a plurality of access nodes. The at least one memory and the computer program code can also be configured to, with the at least one processor, cause the apparatus at least to determine whether to provide a locally coordinated response to the random access message. The at least one memory and the computer program code can further be configured to, with the at least one processor, cause the apparatus at least to provide a response to the random access message based on the determination.

A method, according to certain embodiments, can include receiving a random access message from a user equipment on a common resource. The common resource can include a resource known or shared by a plurality of access nodes. The method can also include determining whether multiple identical random access messages received by multiple receivers are from single user equipment (UE) or from multiple UEs. The method can further include transmitting a response to the single UE or multiple response to multiple UEs based on the determination.

In certain embodiments, an apparatus can include at least one processor and at least one memory including computer program code. The at least one memory and the computer program code can be configured to, with the at least one processor, cause the apparatus at least to receive a random access message from a user equipment on a common resource. The common resource can include a resource known or shared by a plurality of access nodes. The at least one memory and the computer program code can also be configured to, with the at least one processor, cause the apparatus at least to determine whether multiple identical random access messages received by multiple receivers are from single user equipment (UE) or from multiple UEs. The at least one memory and the computer program code can further be configured to, with the at least one processor, cause the apparatus at least to transmit a response to the single UE or multiple responses to multiple UEs based on the determination.

An apparatus, according to certain embodiments, can include means for performing any of the above-described methods. Likewise, in certain embodiments, a computer program product can encode instructions for performing a process that includes any of the above-described methods.

Similarly, a non-transitory computer-readable medium can, according to certain embodiments, be encoded with instructions that, when executed in hardware, perform a process. The process can be any of the above-described methods.

BRIEF DESCRIPTION OF THE DRAWINGS

For proper understanding of the invention, reference should be made to the accompanying drawings, wherein.

DETAILED DESCRIPTION

Certain embodiments relate to using multi-connectivity to improve communication reliability. More particularly, certain embodiments provide methods, devices, and systems to improve reliability to connection setup for a random access channel, while getting connection with more than one cell at the same time. Additionally, certain embodiments may avoid extensive resource consumption or increased collision probability, which may be introduced if multiple nearby eNB have exactly the same RACH resources for initial access. Thus, certain embodiments may achieve a required reliability level in connection establishment by improving RACH procedures without issues of excessive resource consumption or high collision probability.

Certain embodiments provide a common RACH resource based reliable random access procedure where the random access message can be received by multiple access nodes, such as base stations, and the random access response message can be formulated in a local central control unit, instead of a single access node. Moreover, the same response message can be transmitted by one or multiple access nodes to further improve the reliability. The local central control unit can be located at, for example, a mobility management entity (MME). Alternatively, the local central control unit can be located at one of the access nodes, such as at a macro cell for a certain area. In certain embodiments the RACH resources in the involved cells may be different but the knowledge of the resources is common i.e. resources are common form the reception point of view: an access node, such as a base station, knows the resources in another cell and therefore can receive the RACH messages sent by the UEs in the other cell. In certain other embodiments, the resources are common from the transmission point of view: same resources are shared by multiple cells i.e. UEs in different cells may transmit RACH messages in the same resource. In both cases, a UE need not multiplex RACH messages for different access nodes, but a single message can be received by multiple access nodes.

Figure 3A:
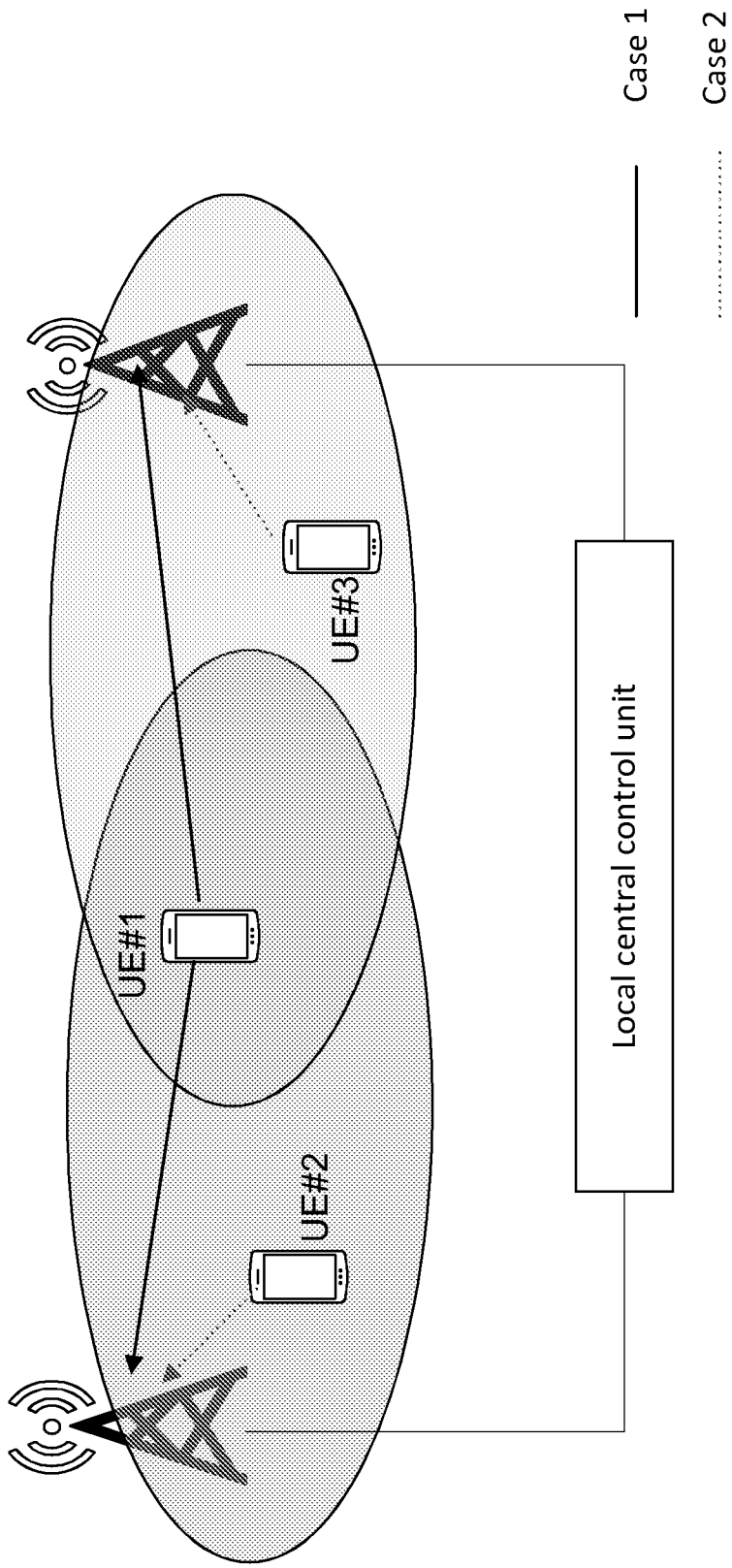
FIG. 3A illustrates two cases that can be distinguished by a local central control unit in certain embodiments.
Figure 3B:
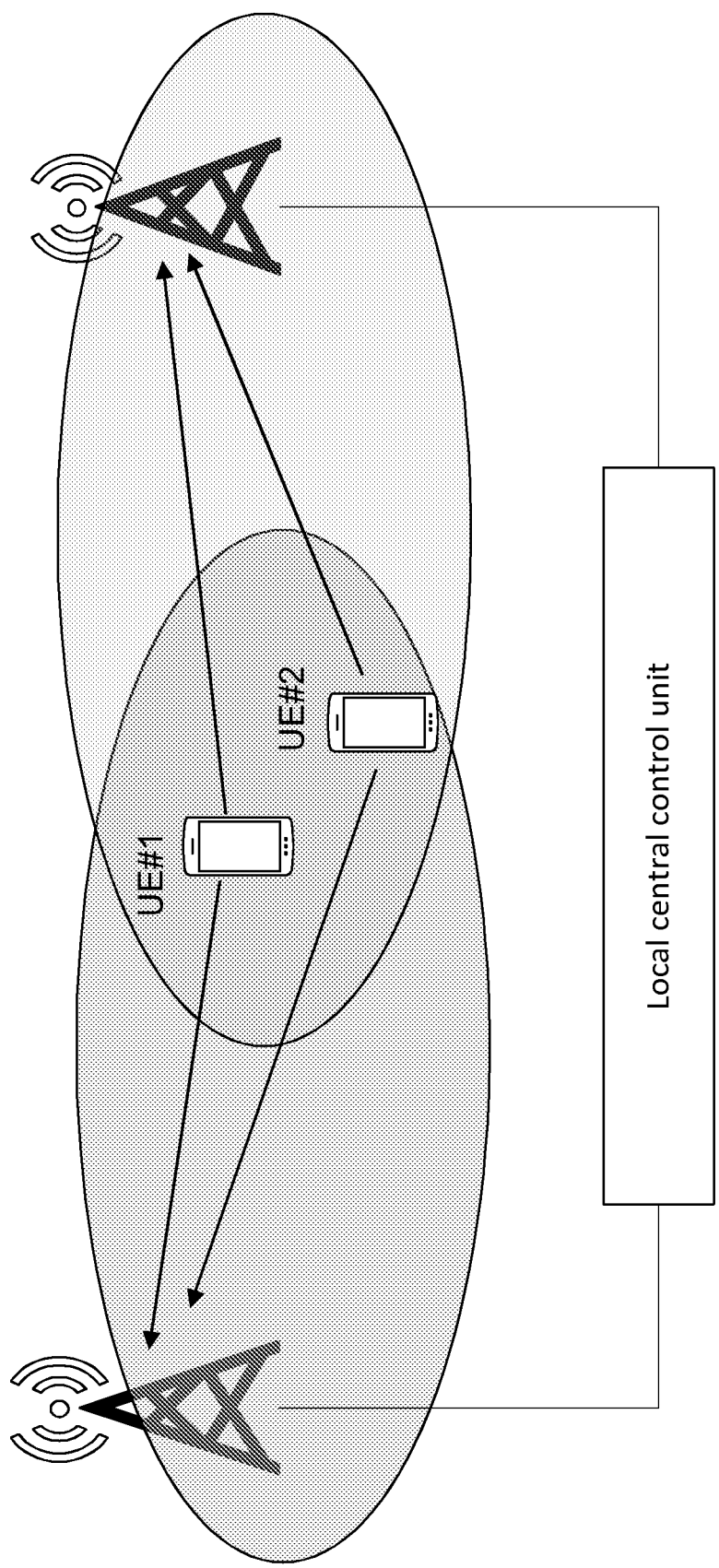
FIG. 3B illustrates another case where two UEs are selecting a same random access resource in certain embodiments.

In addition, certain embodiments provide ways to resolve confusion in the network between two cases: one UE sending random access message with the shared resource as shown in FIG. 3A, and two different UEs selecting the same resource and RACH preamble signature to send random access message, as shown in case 2 in FIG. 3A and FIG. 3B. Moreover, certain embodiments may accomplish these or other improvements without increasing uplink RACH resource consumption.

Figure 1:
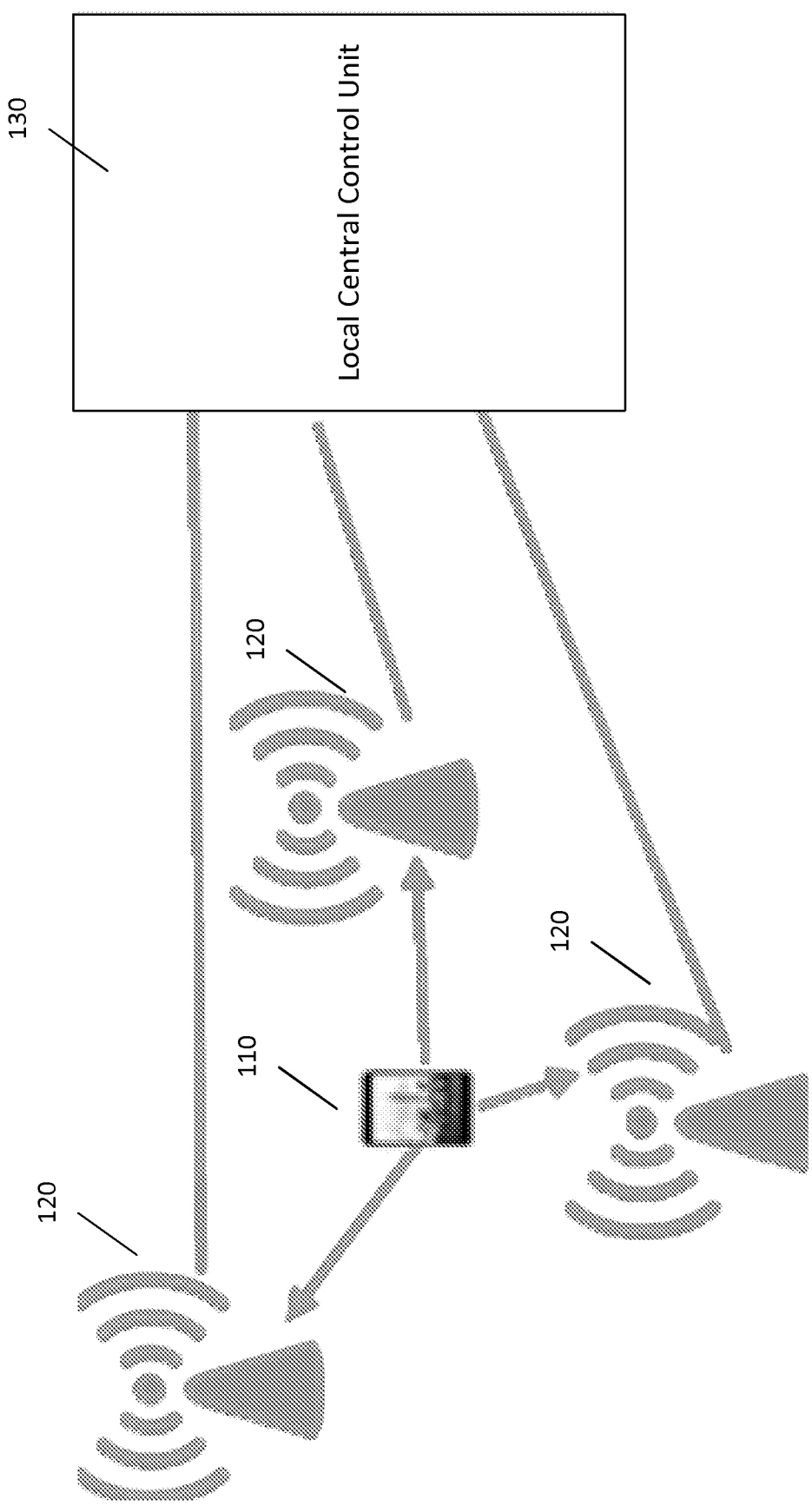
FIG. 1 illustrates a system according to certain embodiments.

FIG. 1 illustrates a system according to certain embodiments. Certain embodiments may employ a synchronous network, as such a network may useful to support a variety of features in LTE for example time division duplex (TDD), enhanced inter-cell interference coordination (eICIC), and so on. As shown in FIG. 1, a user equipment 110 may be near a plurality of access nodes 120 which may each be in communication with a local central control unit 130.

For combining uplink messages and sending downlink message from multiple cells, such as those cells corresponding to access nodes 120, a central control unit 130 can be an independent network element, part of an evolved Node B (eNB), or part of a so-called cloud radio access network (RAN) unit. Thus, while the local central control unit 130 may provide local central control of a plurality of local access nodes 120, the local central control unit 130 may be provided in a variety of geographical places and need not either be centrally or locally located, although such a location may assist in improving the speed of communication with the local central control unit 130. FIG. 1 can be considered an example in which one user equipment (UE) is transmitting a random access message using a common resource.

In order to support a multi-cell reliable random access procedure, various techniques can be applied. For example, a common random access channel (RACH) resource can be defined between cells. The RACH resource can be shared among multiple macro cells or small cells or a combination of macro and small cells in a certain geographical area.

When a UE starts sending out a preamble or a first random access message, the message can be sent over the common resource. The nearby cells can monitor within the common resource to detect any such incoming signals.

This common RACH resource can support the possibility of a UE getting access in more than one cell almost simultaneously. This rapid access may be possible because, with the single transmission, more than one cell can successfully receive this information. Alternatively the reliability of the RACH transmission can be increased by any of the eNBs decoding the message successfully, or the received signal energy from multiple eNBs being combined together before decoding.

The common RACH resource can be informed to UEs in different ways. For example, the RACH resource can be advertised to UEs via broadcasted system information block or dedicated radio resource control (RRC) message. LTE X2, for example, can be modified to include this feature. In order to have common RACH resource, coordination among the neighboring cells may be used. Alternatively, the resource can be pre-configured and not changeable afterwards.

The random access response message can be jointly formulated among cells that can detect the same random access preamble/message. The network may decide whether to send a response message from one cell or from multiple cells separately. In the latter case, the UE may combine transmission from multiple eNB to a single message. Such a combination may, for example, improve reliability. Beamforming transmission of RA response message can be employed, especially if multiple cells transmit the same message.

In addition, in order to improve RACH capacity and to avoid allocating extensive amount of RACH resources to the cells sharing common RACH resource, the eNB and/or local control unit can utilize time of arrival (ToA) and angle of arrival (AoA) to distinguish cases. For example in FIG. 3A, according to a first case, one UE can send a single RACH preamble/message to a common RACH resource that is received by multiple eNB. According to a second case, two UEs can send separate but identical RACH preamble/message in a same common RACH resource.

When the number of antenna elements in eNB increases, the estimation accuracy of the location of the transmitters may increase. This increase in antenna element number may be possible due to new antenna technologies, higher operating frequencies (cmWave, mmWave), and thus shorter wave lengths.

When ToA and AoA from two eNBs point the location of transmission source to two different locations, the network can consider those as two separate UEs. When ToA and AoA from two eNBs point to the same location, the network can consider that a single UE has transmitted. The network may utilize different estimation margins depending on receiver antenna configuration, frequency and so on to decide between these two cases.

Figure 2:
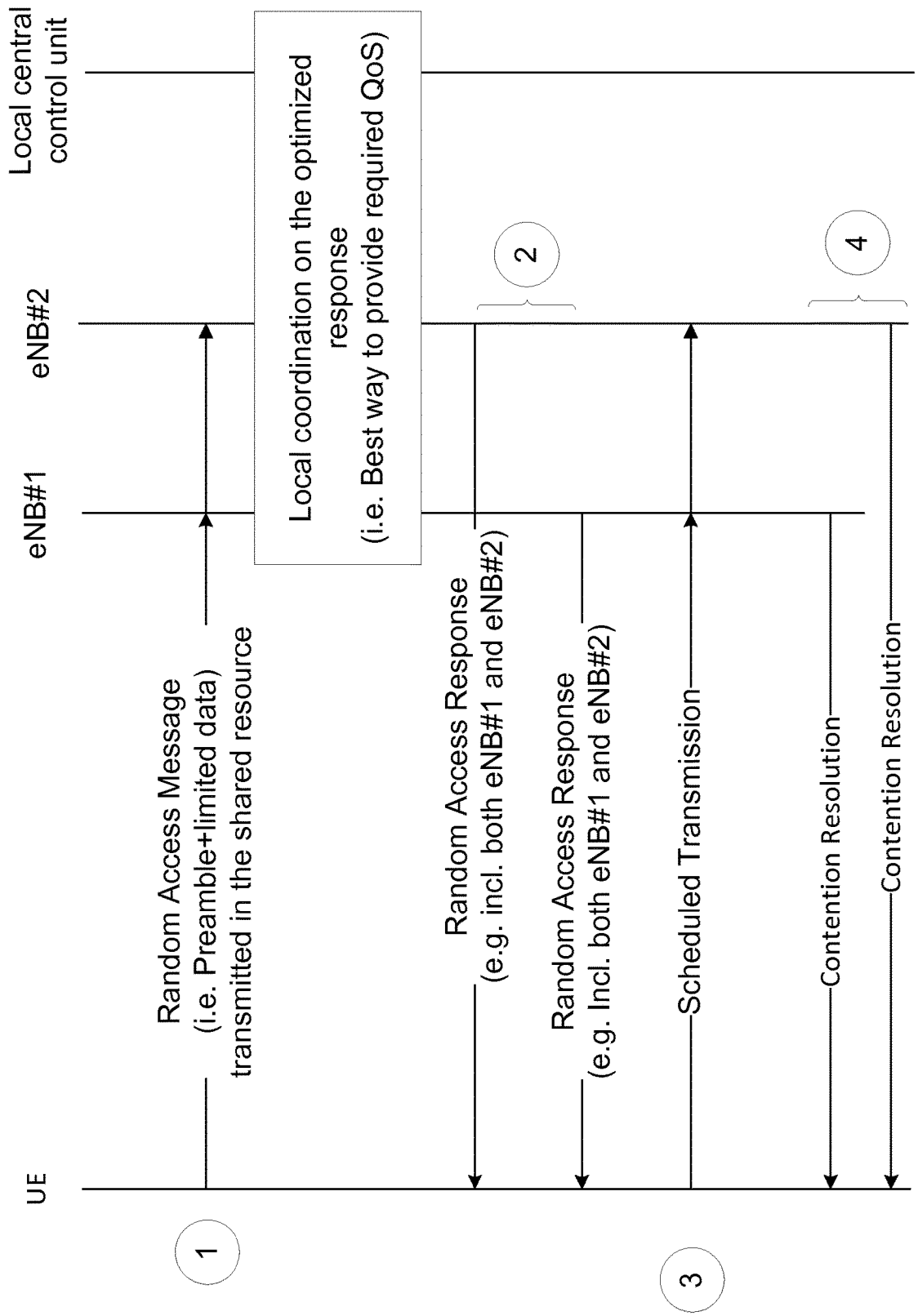
FIG. 2 illustrates a first implementation, according to certain embodiments.

FIG. 2 illustrates a first implementation, according to certain embodiments. In the embodiment of FIG. 2, a common RACH resource may be defined between cells, and thus RACH resource can be shared among a set of macro cells and/or small cells in a certain area.

As shown in FIG. 2, when a UE starting to transmit a random access message, the UE can randomly select one resource on which to transmit this message, as shown in step 1 in FIG. 2.

The random access message can be preamble signature that is common to all services, or may be taken from a separate signature pool reserved for ultra-reliable communication (URC).

Alternatively to preamble-only transmission, the first message can also include limited information, such as, for example, reliability level requirement, UE ID, or the like.

When more than one eNBs can receive the random access message successfully, such information can be forwarded to a local central control unit, which can be a physical unit or just a logical unit.

In case a separate signature pool is reserved for URC or the URC information is included in the first message, the eNB can decide whether to involve local central control unit or not.

Based on the required reliability level, the local central control unit can make an optimized decision on which cell(s) should connect to the device, for example eNB #1 and eNB #2 in FIG. 2. The local central control unit can also formulate the content of random access response message.

The random access response message can be sent from multiple eNBs, for example from two such eNBs, as shown at step 2 in FIG. 2. Sending from multiple eNBs may increase reliability. Alternatively, the random access response message may be sent from just one eNB. In either case, the random access response message may include information from both eNBs for multi-connectivity communication.

Depending on the information contained in the random access response message, UE can send scheduled transmission towards two eNBs, as shown in Step 3 in FIG. 2. As both eNB #1 and 2 may be able decode the message, it is possible that eNB #1 and 2 may perform combining as well.

Contention resolution can be sent back from eNB #1 and eNB #2. Of course, it is also possible that one of the eNBs can transmit such information. In this case, the local central control unit can be involved.

Thus, FIG. 2 illustrates a multi-connectivity reliable random access procedure that can be local central control unit based. This approach may differ from conventional approaches in a variety of ways. For example, in conventional approaches there may be no coordination among neighboring cells on the RACH response message. Likewise, conventionally the devices cannot get multiple responses from different cells triggered by the same random access message. Furthermore, conventionally it is not possible for a UE to connect to more than one eNB at this phase.

FIG. 3A illustrates two cases that can be distinguished by a local central control unit in certain embodiments. The above common RACH pool and centralized random access response method can lead to confusion at a local central control unit between the following two cases illustrated in FIG. 3A: (1) one UE sending random access message with the shared resource and the signal of this UE is heard by two eNBs, and (2) multiple UEs are selecting the same resource to send random access message but each of the UEs is heard only by one eNB. Another situation of case (2) is illustrated in FIG. 3B. If these cases are not distinguished, the local central control unit can make a wrong decision aiming to multi-connectivity in cases when it is not possible.

Some of the embodiments that can address the issues of distinguishing the two cases of FIG. 3A may also apply to the situation of FIG. 3B, where two UEs that both can be heard by two eNBs have chosen the same resource for their random access messages. In this case the control unit could aim correctly to multi-connectivity and the contention resolution phase of the procedure in FIG. 2 would resolve the conflict of colliding random access messages. However, being able to resolve the conflict in an earlier stage may be desirable.

More particularly, in the cases illustrated in FIG. 3A, time of arrival and angle of arrival can be used for distinguishing if multi-connectivity is possible. Similarly, in the cases illustrated in FIG. 3B, time of arrival and angle of arrival can be used for early contention resolution.

In order to address the situation posed in FIG. 3A, a variety of methods are possible. For example, using antenna techniques, for example AoA, possibly combined with ToA, it may be often possible to avoid confusion. In case 1 the AoA and ToA information at the two eNBs may be consistent in pointing to a single location, while in case 2 the information may be inconsistent. However, for AoA, an antenna array or multiple antennas may be needed. In case of 3D-MIMO, vertical dimension can be utilized as well. In 3D-MIMO, each eNB may be able not only to detect horizontal AoA of the transmitted signal but also vertical AoA. The vertical AoA can be utilized to estimate distance of the UE from eNB, together with ToA.

To enable this decision making in a central node, or for other purposes, each eNB can provide the estimated ToA and AoA (horizontal and vertical angle) to the central unit with the received RACH preamble/message. When each eNB's physical location and height is known in the central node, the central node can estimate the direction and distance of the transmitter of the received signal, and whether these estimations point to a single or multiple locations.

When the estimations point to multiple locations, the network can continue with separate procedures in the two cells. If the estimations point to a single location, the procedure with multi-connectivity can be followed. A threshold of location accuracy can be used to assess whether the estimations point to a single location.

Another option is to include some information in the random access message that can be used for distinguishing UEs or UE groups. As an example, a one-bit indication could tell whether the UE intends to have multi-connectivity or hears multiple eNBs, or intends to have normal random access procedure or hears only one eNB. As another example, the message could include a randomly chosen or a unique UE identity. The central node can compare the identities forwarded by the eNBs and can immediately see if the signals originated from different UEs. In addition, if the identity is unique or long enough, the contention resolution, step 4 in FIG. 2, can be skipped.

A combination of methods can be used. For example, if ToA and AoA techniques resolve many of the conflicts, resolving the rest of the conflicts with sufficient probability may rely on a shorter identity than if ToA and AoA techniques were not in use.

In the situation of FIG. 3B, the above methods can be utilized for early contention resolution. If AoA and ToA determinations, combined from multiple eNBs, lead to a conclusion that signals are coming from multiple locations, the network has at least two options. According to a first option, the network may decide not to respond at all. In this case, each UE can retransmit its message after a random back-off time. According to a second option, the network may respond to some or all of the messages coming from different locations. Using antenna techniques the responses may be directed towards the different locations. The responses directed to different locations can schedule different resources for the transmissions in step 3 of FIG. 2.

When the signals propagate through multiple paths, it may not always be possible to distinguish whether there are multiple signal sources or just a single one. Therefore, it may be possible that the central node may end up sending multiple responses for a single UE. This is not necessarily a problem for the UE, as long as the UE can receive at least one of the responses. The other responses may just unnecessarily use some of the DL resources and unnecessarily reserve some UL resources for the messages in step 3 of FIG. 2, but they do not prolong the UE's random access procedure.

Figure 4:
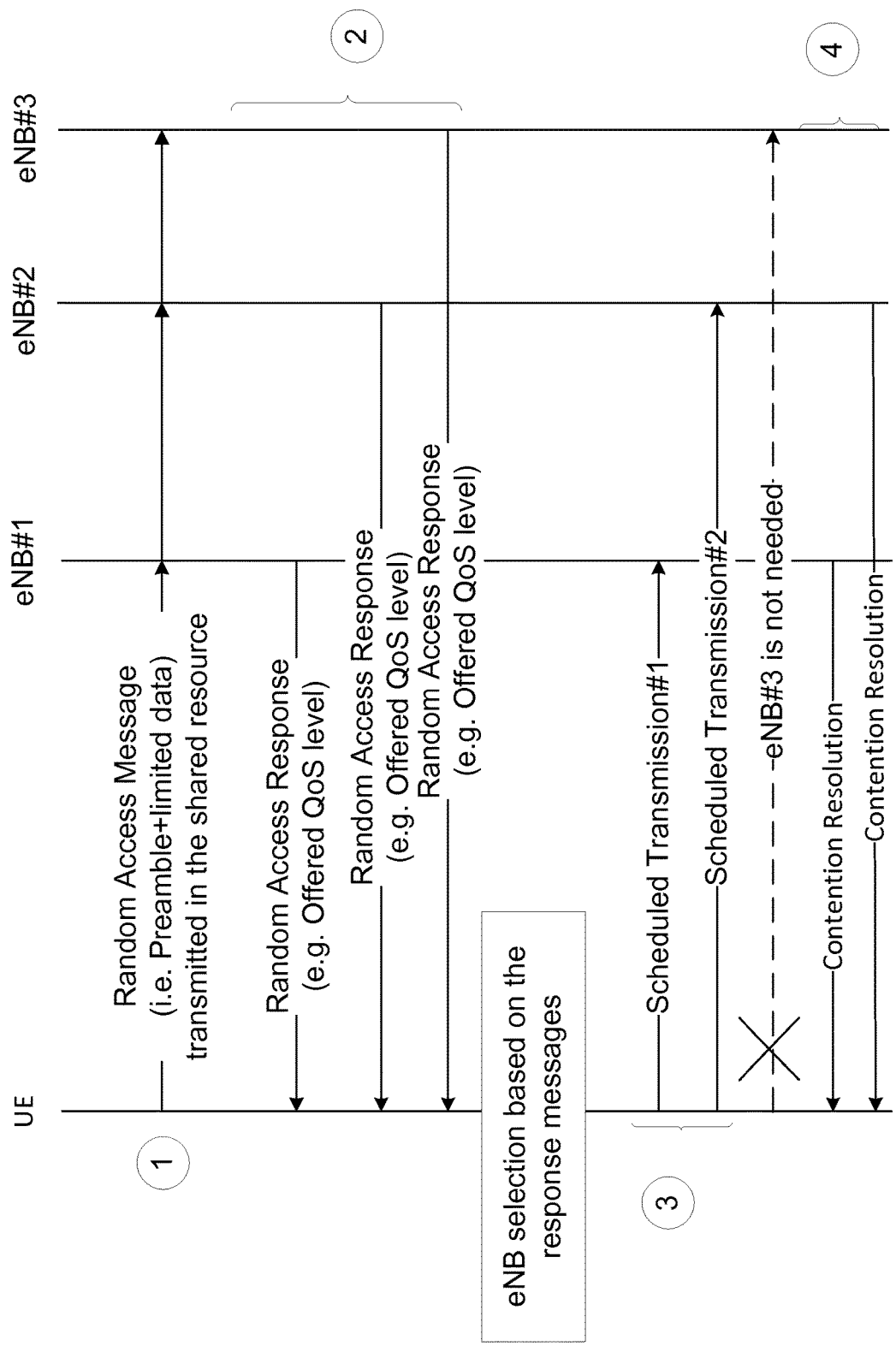
FIG. 4 illustrates a second implementation, according to certain embodiments.

FIG. 4 illustrates a second implementation, according to certain embodiments. In addition to the described implementation embodiment above, another option is to have UE-based cell(s) selection where no local central control unit is needed as shown in FIG. 4.

The determination of one or multiple resources can also happen inside a single access node, such as an eNB, when the access node has multiple antennas connected receiver units. In this case, the access node itself may able to distinguish different UEs in spatial domain. Domains in such a case may be pointing to significantly different physical locations. Thus, there may not be a need to have even a coordinator between access nodes, as the access node can distinguish amongst UE random access responses itself.

When a UE sends out a random access message at step 1, more than one eNB can, at step 2, send back a random access response message with potential offered reliability information. This information may be based on, for example, system load, received UE power, location information, or the like.

According to a desired QoS, the UE can select the best access node(s), such as eNB(s), according to offered QoS or other factors. More than one access node, for example base station (BS), can be selected in order to achieve for example the required reliability requirement.

The UE can then proceed with scheduled transmission at step 3 for any access node desired. Contention resolution can occur at step 4, for the selected access nodes.

Figure 5:
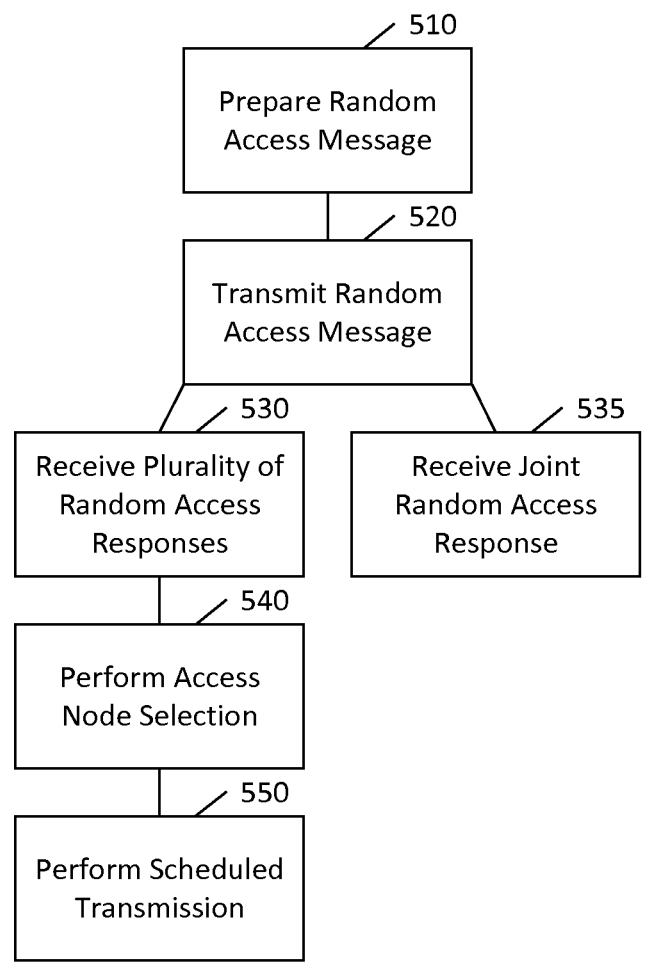
FIG. 5 illustrates a method according to certain embodiments.

FIG. 5 illustrates a method according to certain embodiments. As shown in FIG. 5, a method can include, at 510, preparing a random access message at a user equipment. The preparing can optionally include providing, in the random access message, a user equipment identifier.

The method can also include, at 520, transmitting the random access message from the user equipment on a shared resource. The shared resource can include a random access channel shared by a plurality of access nodes.

The method can further include, at 530, receiving a plurality of random access responses each from a different respective one of the plurality of access nodes. The method can additionally include, at 540, performing access node selection at the user equipment based on the received responses. The method can further include, at 550, performing scheduled transmission to at least one of the plurality of access nodes based on the performed access node selection.

The plurality of random access responses can each relate to at least two of the access nodes. The plurality of random access responses can be based on local coordination among the at least two of the access nodes. Alternatively, the plurality of random access responses can be uncoordinated, and a user equipment can select a most suitable cell.

Alternatively, the random access responses can relate to just a single access node. For example, the method can include, at 535, receiving a joint random access response to the random access message. The joint random access response can relate to at least two of the plurality of access nodes. In some cases, only one such joint response may be received and in some cases the joint response may happen to refer to the resources of only one access node. Other situations are possible.

The access node(s) that formulate the joint random access response may be different from than access nodes that transmit the joint access response. Additionally, for reliability or other purposes, additional access nodes may provide the joint random access response, even when the user equipment is not to be scheduled to use those access nodes. Such additional joint random access responses may assist the user equipment in correctly identifying the resources to be used.

For example, for transmission of the message, in principle the message can be sent by one or multiple involved access nodes. For example, two access points (eNB #1 and #2) can be selected and their information can be included in the joint random access response message. For transmission of the message, there are two different ways. According to a first way, the same message can be transmitted by both eNB #1 and eNB #2 and optionally by other nearby access points as well. In this way diversity gain can be expected at UE side and hence with better reliability to get this message. According to a second way, the message may only be transmitted by one access node (for example eNB #1). If the same modulation and coding scheme (MCS) is used as in the first way, there may be no diversity gain and performance may be, on average, lower than according to the first way.

The method of FIG. 5 may be performed by a device such as, for example, a user equipment.

Figure 6:
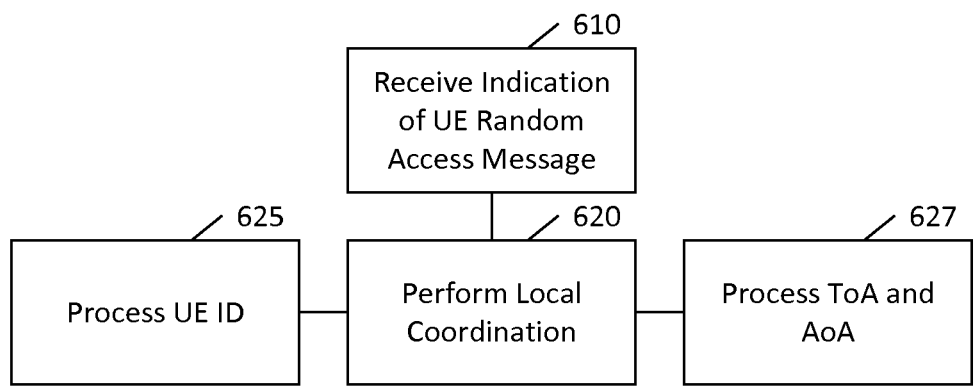
FIG. 6 illustrates another method according to certain embodiments.

FIG. 6 illustrates another method according to certain embodiments. As shown in FIG. 6, a method can include, at 610, receiving an indication that a user equipment has sent a random access message on a shared resource. The shared resource can include a random access channel shared by a plurality of access nodes. The method can also include, at 620, performing local coordination of at least two of the plurality of access nodes with respect to the random access message.

The coordination can be performed at an entity distinct from the plurality of access nodes. Alternatively, the coordination can be performed at one of the access nodes.

The local coordination can be configured to provide a response optimized to provide a required quality of service for the user equipment. The local coordination can be configured to cause at least two of the plurality of access nodes to transmit a random access response to the user equipment in response to random access message. This random access response may be a joint random access response. The random access response can be configured to provide information regarding the at least two access nodes.

The local coordination can alternatively be configured to provide a single random access response configured to provide information regarding at least two of the plurality of access nodes.

The method can also include, at 625, processing a user equipment identifier (UE ID) from the random access message. The user equipment identifier can be used to correlate a plurality of reports of a given random access message.

The method can further include, at 627, processing at least one of time of arrival (ToA) or angle of arrival (AoA) associated with the random access message. The ToA and AoA can be used alone, or in combination with the UE ID to correlate a plurality of reports of a given random access message.

Figure 7:
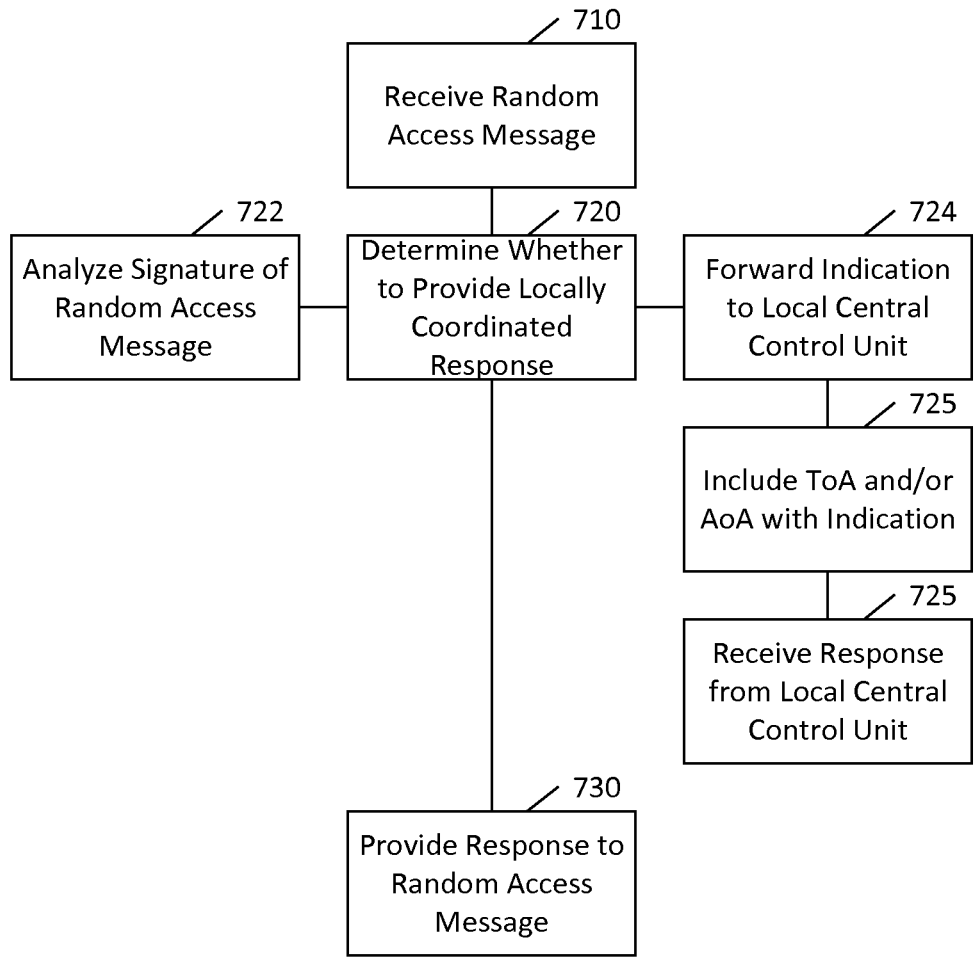
FIG. 7 illustrates a further method according to certain embodiments.

The method of FIG. 7 may be performed by a devices such as, for example, an MME or other local central control unit.

FIG. 7 illustrates a further method according to certain embodiments. As shown in FIG. 7, a method can include, at 710, receiving a random access message from a user equipment on a shared resource. The shared resource can include a random access channel shared by a plurality of access nodes. The method can also include, at 720, determining whether to provide a locally coordinated response to the random access message. The method can further include, at 730, providing a response to the random access message based on the determination.

The determining can include, at 722, analyzing a signature of the random access message. Also, or alternatively, the determining can include, at 724, forwarding an indication of the received random access message to a local central control unit and, at 726, receiving a response from the local central control unit. The method can additionally optionally include, at 725, including at least one of time of arrival or angle of arrival information of the received random access message with the indication.

The method of FIG. 7 may be performed by a device such as, for example, an access node. The methods of FIGS. 5, 6, and 7 may be usable together in certain embodiments, as illustrated for example in FIG. 2.

Figure 8:
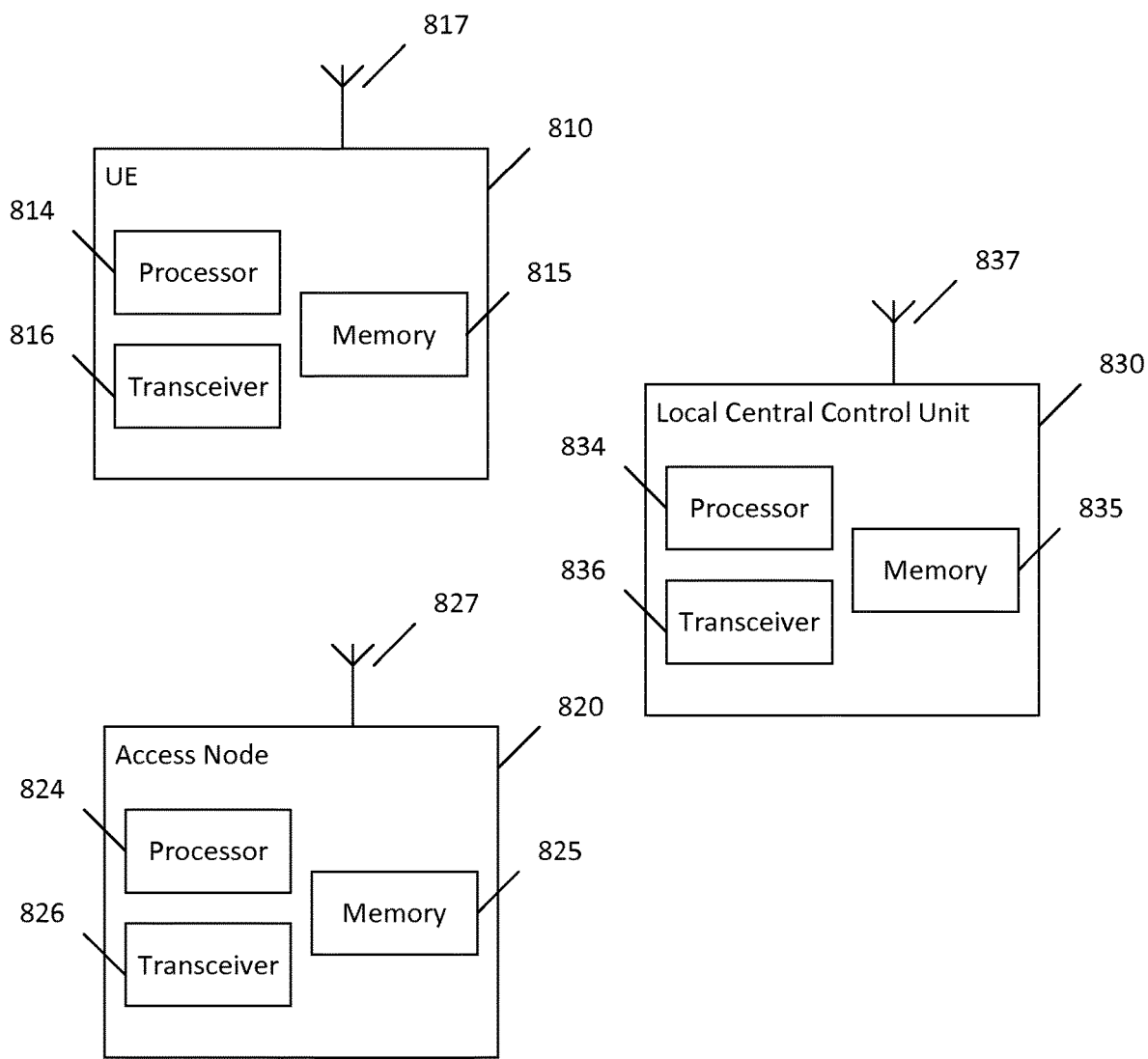
FIG. 8 illustrates another system according to certain embodiments.

FIG. 8 illustrates another system according to certain embodiments. In one embodiment, a system may include multiple devices, such as, for example, at least one UE 810, at least one access node 820, which may be an eNB or other base station or access point, and at least one local central control unit 830, which may be an MME, eNB, or other device configured to perform local centralized control.

Each of these devices may include at least one processor, respectively indicated as 814, 824, and 834. At least one memory can be provided in each device, and indicated as 815, 825, and 835, respectively. The memory may include computer program instructions or computer code contained therein. The processors 814, 824, and 834 and memories 815, 825, and 835, or a subset thereof, can be configured to provide means corresponding to the various blocks of FIGS. 5-7 and 10.

As shown in FIG. 8, transceivers 816, 826, and 836 can be provided, and each device may also include an antenna, respectively illustrated as 817, 827, and 837. Other configurations of these devices, for example, may be provided. For example, local central control unit 830 may be configured for wired communication, in addition to wireless communication, and in such a case antenna 837 can illustrate any form of communication hardware, without requiring a conventional antenna.

Transceivers 816, 826, and 836 can each, independently, be a transmitter, a receiver, or both a transmitter and a receiver, or a unit or device that is configured both for transmission and reception.

Processors 814, 824, and 834 can be embodied by any computational or data processing device, such as a central processing unit (CPU), application specific integrated circuit (ASIC), or comparable device. The processors can be implemented as a single controller, or a plurality of controllers or processors.

Memories 815, 825, and 835 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 810, access node 820, and local central control unit 830, to perform any of the processes described herein (see, for example, FIGS. 5-7 and 10). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 8 illustrates a system including a UE, access node, and local central control unit, embodiments of the invention may be applicable to other configurations, and configurations involving additional elements. For example, not shown, additional UEs may be present, and additional core or radio access network elements may be present, as illustrated in FIGS. 1-4.

Figure 9:
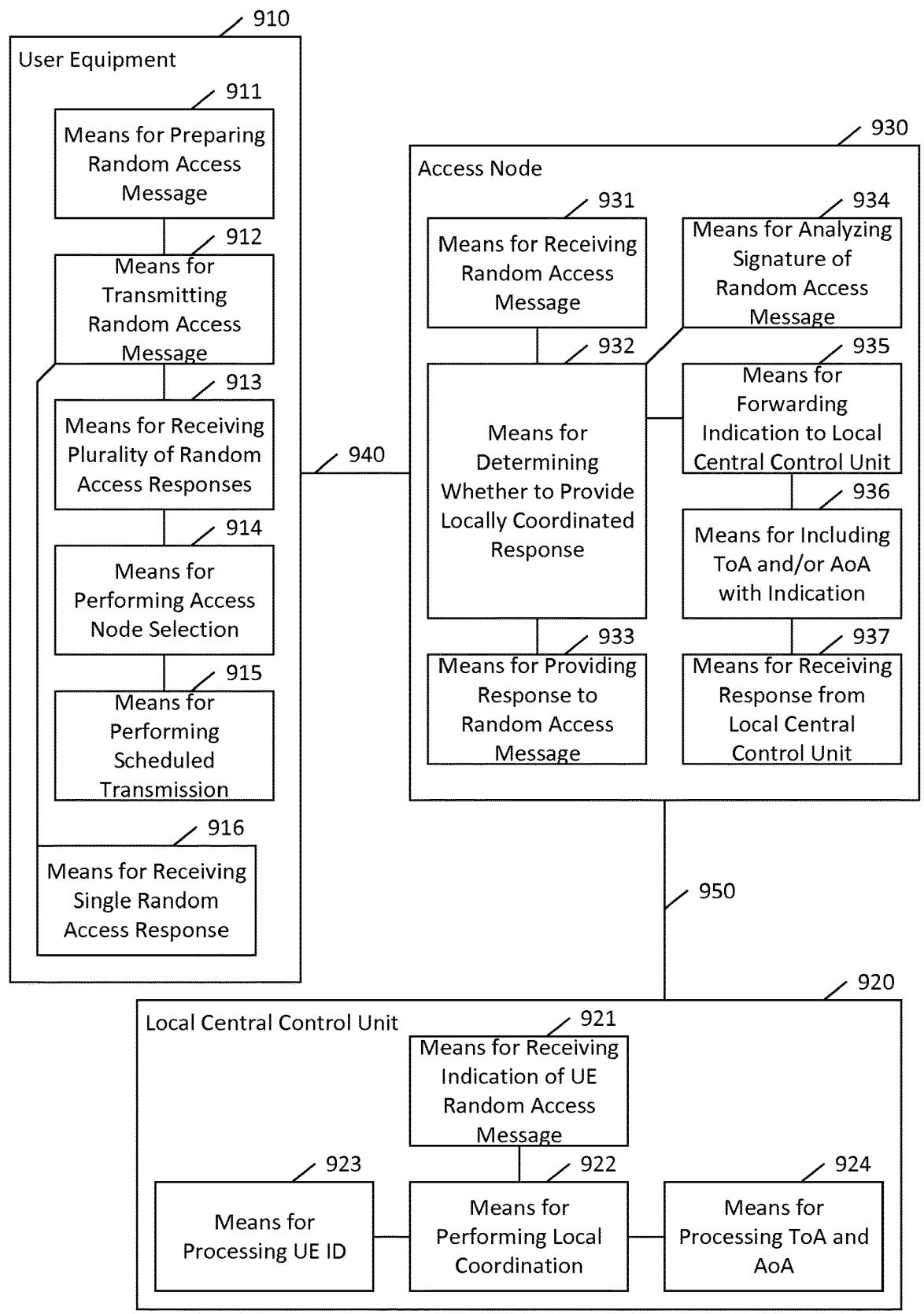
FIG. 9 illustrates a further system according to certain embodiments.

FIG. 9 illustrates a further system according to certain embodiments. As shown in FIG. 9, the system can include a user equipment 910. The user equipment 910 can include means for preparing 911 a random access message at a user equipment. The preparing can optionally include providing, in the random access message, a user equipment identifier.

The user equipment 910 can also include means for transmitting 912 the random access message from the user equipment on a shared resource. The shared resource can include a random access channel shared by a plurality of access nodes.

The user equipment 910 can further include means for receiving 913 a plurality of random access responses each from a different respective one of the plurality of access nodes. The user equipment 910 can additionally include means for performing 914 access node selection at the user equipment based on the received responses. The user equipment 910 can further include means for performing 915 scheduled transmission to at least one of the plurality of access nodes based on the performed access node selection.

The plurality of random access responses can each relate to at least two of the access nodes. The plurality of random access responses can be based on local coordination among the at least two of the access nodes.

Alternatively, the random access responses can relate to just a single access node. For example, the user equipment 910 can include means for receiving 916 a single random access response to the random access message. The single random access response can relate to at least two of the plurality of access nodes.

The system can also include a local central control unit 920, such as an MME. The local central control unit 920 can include means for receiving 921 an indication that a user equipment has sent a random access message on a shared resource. The shared resource can include a random access channel shared by a plurality of access nodes. The local central control unit 920 can also include means for performing 922 local coordination of at least two of the plurality of access nodes with respect to the random access message.

The coordination can be performed at an entity distinct from the plurality of access nodes. Alternatively, the coordination can be performed at one of the access nodes. Thus, the local central control unit 920 can be physically and/or logically separate from the access nodes.

The local coordination can be configured to provide a response optimized to provide a required quality of service for the user equipment. The local coordination can be configured to cause at least two of the plurality of access nodes to transmit a random access response to the user equipment in response to random access message. This random access response may be a joint random access response. The random access response can be configured to provide information regarding the at least two access nodes.

The local coordination can alternatively be configured to provide a single random access response configured to provide information regarding at least two of the plurality of access nodes.

The local central control unit 920 can also include means for processing 923 a user equipment identifier (UE ID) from the random access message. The user equipment identifier can be used to correlate a plurality of reports of a given random access message.

The local central control unit 920 can further include means for processing 924 at least one of time of arrival (ToA) or angle of arrival (AoA) associated with the random access message. The ToA and AoA can be used alone, or in combination with the UE ID to correlate a plurality of reports of a given random access message.

The system can further include at least one access node 930. In various embodiments there may be a plurality of such access nodes, though only one is shown in this drawing for the purposes of illustration.

The access node 930 can include means for receiving 931 a random access message from a user equipment on a shared resource. The shared resource can include a random access channel shared by a plurality of access nodes. The access node 930 can also include means for determining 932 whether to provide a locally coordinated response to the random access message. The access node 930 can further include means for providing 933 a response to the random access message based on the determination.

The access node 930 can include means for analyzing 934 a signature of the random access message. Also, or alternatively, the access node 930 can include means for forwarding 935 an indication of the received random access message to a local central control unit and means for receiving 937 a response from the local central control unit. The access node 930 can additionally optionally include means for including 936 at least one of time of arrival or angle of arrival information of the received random access message with the indication.

The user equipment 910, access node 930, and local central control unit 920 may be variously constructed, such as in the way illustrated in FIG. 8. Other implementations are also permitted. The user equipment 910 may be in communication with the access node 930 over wireless link 940. Likewise, the access node 930 may be in communication with the local central control unit 920 over a communication link 950, which may be wireless or wired.

Figure 10:
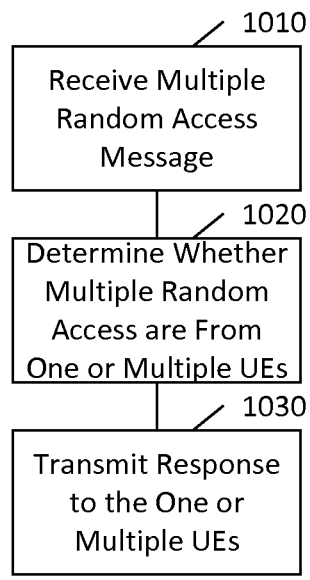
FIG. 10 illustrates an additional method according to certain embodiments.

FIG. 10 illustrates an additional method according to certain embodiments. As shown in FIG. 10, a method may include, at 1010, receiving a random access message from a user equipment on a common resource. The common resource can be a resource known or shared by a plurality of access nodes. The method can also include, at 1020, determining whether multiple identical random access messages received by two receivers are from single user equipment (UE) or from multiple UEs. The method can further include, at 1030, transmitting a response to the single UE or multiple UEs based on the determination.

Figure 11:
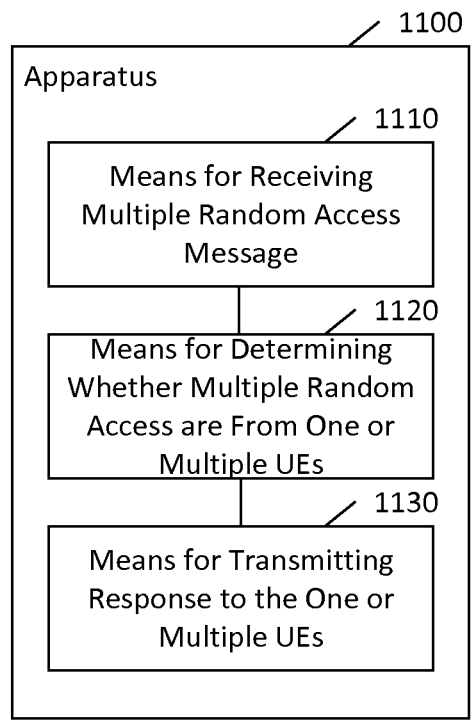
FIG. 11 illustrates an apparatus according to certain embodiments.

FIG. 11 illustrates an apparatus according to certain embodiments. As shown in FIG. 11, an apparatus 1100 may include means for receiving 1110 a random access message from a user equipment on a common resource. The common resource can be a resource known or shared by a plurality of access nodes. The apparatus 1100 can also include means for determining 1120 whether multiple identical random access messages received by two receivers are from single user equipment (UE) or from multiple UEs. The apparatus 1100 can further include means for transmitting 1130 a response to the single UE or multiple UEs based on the determination. The various means of FIG. 11 can be variously embodied. Two examples of such embodiments are the access node 820 in FIG. 8 and the local central control unit 830 in FIG. 8.

Certain embodiments may have various benefits and/or advantages. For example, in certain embodiments a user equipment can get access to multiple cells simultaneously. Furthermore, in certain embodiments, communication reliability can be increased significantly, by increasing success rate of both random access message and random access response message.

Additionally, certain embodiments can configure RACH resources when having common pool for those can be reduced without increasing the collision probability. Moreover, in certain embodiments, there may be a simple implementation in the user equipment.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one non-transitory memory including computer program code,
   wherein the at least one non-transitory memory and the computer program code are configured to, with the at least one processor, cause the apparatus at least to:
   prepare a random access message at a user equipment;
   transmit the random access message from the user equipment on a common channel resource, wherein the common channel resource comprises a channel resource known to a plurality of access nodes or a channel resource shared with the plurality of access nodes; and
   receive, in response to the random access message, a plurality of joint random access responses from different respective ones of the plurality of access nodes, wherein the plurality of joint random access responses comprise a same joint random access response.

2. The apparatus of claim 1, wherein the at least one non-transitory memory and the computer program code are configured to, with the at least one processor, cause the apparatus at least to perform access node selection at the user equipment based on the received responses.

3. The apparatus of claim 2, wherein the at least one non-transitory memory and the computer program code are configured to, with the at least one processor, cause the apparatus at least to perform scheduled transmission to at least one of the plurality of access nodes based on the performed access node selection.

4. The apparatus of claim 1, plurality of joint random access responses relate to at least two of the plurality of access nodes.

5. The apparatus of claim 4, wherein the plurality of joint random access responses are based on local coordination among the at least two of the plurality of access nodes.

6. The apparatus of claim 1, wherein the at least one non-transitory memory and the computer program code are configured to, with the at least one processor, cause the apparatus at least to provide, in the random access message, a user equipment identifier.

7. The apparatus of claim 1, wherein the plurality of joint random access responses comprise reliability information based on at least one of:
   a system load,
   a received power of the user equipment, or
   location information.

8. The apparatus of claim 2, wherein the performing of the access node selection at the user equipment is further based on a reliability requirement.

9. The apparatus of claim 1, wherein the at least one non-transitory memory and the computer program code are configured to, with the at least one processor, cause the apparatus to provide, in the random access message, an indication of at least one of:
that the user equipment intends to participate in multi-connectivity, or
that the user equipment intends to not participate in multi-connectivity.

10. An apparatus, comprising:
at least one processor; and
at least one non-transitory memory including computer program code,
wherein the at least one non-transitory memory and the computer program code are configured to, with the at least one processor, cause the apparatus at least to:
receive an indication that a user equipment has sent a random access message on a common channel resource, wherein the common channel resource comprises a channel resource known to or shared with a plurality of access nodes;
perform local coordination of at least two of the plurality of access nodes with respect to the random access message, wherein the local coordination is configured to formulate a joint random access response; and
transmit the joint random access response in response to the random access message, wherein the joint random access response is caused to be transmitted with the at least two of the plurality of access nodes, wherein respective joint random access responses caused to be transmitted with the at least two of the plurality of access nodes comprise a same joint random access response.

11. The apparatus of claim 10, wherein the local coordination is performed at an entity distinct from the plurality of access nodes or at an entity selected from one of the plurality of access nodes.

12. The apparatus of claim 10, wherein the local coordination is configured to formulate a joint random access response optimized to provide a required quality of service for the user equipment.

13. The apparatus of claim 10, wherein the joint random access response is configured to provide information regarding the at least two access nodes.

14. The apparatus of claim 10, wherein the at least one non-transitory memory and the computer program code are configured to, with the at least one processor, cause the apparatus at least to process a user equipment identifier from the random access message, wherein the user equipment identifier is used to correlate a plurality of reports of the random access message.

15. An apparatus, comprising:
at least one processor; and
at least one non-transitory memory including computer program code,
wherein the at least one non-transitory memory and the computer program code are configured to, with the at least one processor, cause the apparatus at least to:
receive a random access message from a user equipment on a common channel resource, wherein the common channel resource comprises a channel resource known to or shared with a plurality of access nodes;
determine whether to provide a locally coordinated random access response to the random access message; and
transmit a joint random access response to the random access message based on the determination, wherein the joint random access response is caused to be transmitted with two or more of the plurality of access nodes, wherein respective joint random access responses caused to be transmitted with the two or more of the plurality of access nodes comprise a same joint random access response.

16. The apparatus of claim 15, wherein the joint random access response includes information regarding at least two of the plurality of access nodes.

17. The apparatus of claim 15, wherein the at least one non-transitory memory and the computer program code are configured to, with the at least one processor, cause the apparatus at least to analyze a signature of the random access message.

18. The apparatus of claim 15, wherein the at least one non-transitory memory and the computer program code are configured to, with the at least one processor, cause the apparatus at least to forward an indication of the received random access message to a local central control unit and receive a response from the local central control unit.

19. The apparatus of claim 18, wherein the at least one non-transitory memory and the computer program code are configured to, with the at least one processor, cause the apparatus at least to include at least one of time of arrival or angle of arrival information of the received random access message with the indication.

20. The apparatus of claim 15, wherein the at least one non-transitory memory and the computer program code are configured to, with the at least one processor, cause the apparatus at least to further determine whether multiple identical random access messages received with multiple receivers are from single user equipment or from multiple user equipment; and transmit the joint random access response to the single user equipment or to multiple user equipment based on the determination.

\* \* \* \* \*

UNITED STATES PATENT AND TRADEMARK OFFICE
CERTIFICATE OF CORRECTION

Page 1 of 1

PATENT NO. : 10,764,928 B2
APPLICATION NO. : 15/566757
DATED : September 1, 2020
INVENTOR(S) : Zexian Li et al.

It is certified that error appears in the above-identified patent and that said Letters Patent is hereby corrected as shown below:

In the Claims

In Claim 4:
Column 14, Line 46, "claim 1, plurality" should be deleted and --claim 1, wherein the plurality-- should be inserted.

Signed and Sealed this
Twentieth Day of October, 2020

Andrei Iancu
*Director of the United States Patent and Trademark Office*